United States Patent
Carreno et al.

(10) Patent No.: US 12,339,627 B2
(45) Date of Patent: Jun. 24, 2025

(54) METHOD FOR MANUFACTURING A TIMEPIECE BEARING

(71) Applicant: ROLEX SA, Geneva (CH)

(72) Inventors: William Carreno, Geneva (CH); Vannina Linck, Saint-Julien-en-Genevoix (FR); Alexandre Oliveira, Amancy (FR); Cédric Moreaux, Les Rousses (FR)

(73) Assignee: ROLEX SA, Geneva (CH)

( * ) Notice: Subject to any disclaimer, the term of this patent is extended or adjusted under 35 U.S.C. 154(b) by 276 days.

(21) Appl. No.: 17/634,018

(22) PCT Filed: Aug. 12, 2020

(86) PCT No.: PCT/EP2020/072569
§ 371 (c)(1),
(2) Date: Feb. 9, 2022

(87) PCT Pub. No.: WO2021/032552
PCT Pub. Date: Feb. 25, 2021

(65) Prior Publication Data
US 2022/0291634 A1    Sep. 15, 2022

(30) Foreign Application Priority Data
Aug. 19, 2019 (EP) .................................. 19192401
Apr. 7, 2020 (EP) .................................. 20168538

(51) Int. Cl.
*G04B 31/06* (2006.01)
*B23H 9/06* (2006.01)
(Continued)

(52) U.S. Cl.
CPC .............. *G04B 31/06* (2013.01); *B23H 9/06* (2013.01); *G04B 31/008* (2013.01); *G04B 31/04* (2013.01); *B23H 2200/10* (2013.01)

(58) Field of Classification Search
CPC ...... G04B 31/06; G04B 31/008; G04B 31/04; B23H 9/06; B23H 2200/10
See application file for complete search history.

(56) References Cited

U.S. PATENT DOCUMENTS 1,440,059 A * 12/1922 Colomb ............. G04B 31/0087
368/324
2,700,273 A    1/1955 Godat
(Continued)

FOREIGN PATENT DOCUMENTS

CH    282449 A    4/1952
CH    393194 A    2/1965
(Continued)

OTHER PUBLICATIONS

International Search Report and Written Opinion dated Oct. 26, 2020 in corresponding application No. PCT/EP2020/072569; w/English partial translation and partial machine translation (total 16 pages).

(Continued)

*Primary Examiner* — Ryan J. Walters
(74) *Attorney, Agent, or Firm* — Seckel IP, PLLC

(57) ABSTRACT

A method for manufacturing a pivot bearing (1) for the pivoting of a timepiece component (2), in particular a pivot stone, includes:—boring (E1) a hole (10a) in a bearing blank (1a) along an axis (A1) intended for the pivoting of a timepiece component (2), this hole (10a) forming a start point (13a) of a first pivot zone (13) of the bearing (1), then—laser engraving (E2), in the blank (1a), in particular using a femtosecond laser, a second clearance zone (14) of the bearing (1), juxtaposed with the start point (13a) of a first pivot zone (13), this second clearance zone (14) of the bearing (1) opening at a first face (11a) of the bearing (1) blank (1a), then—removing material by wear (E3), in particular by olive-cutting, at the start point (13a) of the first (Continued)

pivot zone (13) of the bearing (1) and a boundary zone (14a) between the start point (13a) and the second clearance zone (14) of the bearing (1) in order to form a first pivot zone (13) and a second clearance zone (14) that are juxtaposed, connected to each other by a rounded connection.

20 Claims, 4 Drawing Sheets

(51) Int. Cl.
    *G04B 31/008*     (2006.01)
    *G04B 31/04*     (2006.01)

(56) References Cited

U.S. PATENT DOCUMENTS

| | | | |
|---|---|---|---|
| 9,329,575 B2 * | 5/2016 | Besutti | G04B 31/06 |
| 10,088,748 B2 | 10/2018 | Calame | |
| 11,175,629 B2 * | 11/2021 | Besutti | G04B 31/06 |
| 2011/0164478 A1 | 7/2011 | Conus et al. | |
| 2014/0254332 A1 | 9/2014 | Besutti et al. | |
| 2015/0165562 A1 | 6/2015 | Marjanovic et al. | |
| 2016/0179000 A1 | 6/2016 | Calame | |
| 2019/0146416 A1 | 5/2019 | Besutti et al. | |
| 2022/0236693 A1 | 7/2022 | Besutti et al. | |

FOREIGN PATENT DOCUMENTS

| | | |
|---|---|---|
| CN | 104049523 A | 9/2014 |
| CN | 106029287 A | 10/2016 |
| EP | 1986059 A | 10/2008 |
| EP | 2757426 A1 | 7/2014 |
| EP | 2778801 A1 | 9/2014 |
| EP | 3067757 A1 | 9/2016 |
| EP | 3483665 A1 | 5/2019 |
| GB | 729023 A | 4/1955 |
| JP | 2014172401 A | 9/2014 |
| JP | 2016121999 A | 7/2016 |
| JP | 2019090801 A | 6/2019 |
| WO | 2016146305 A1 | 9/2016 |
| WO | 2021018491 A1 | 2/2021 |

OTHER PUBLICATIONS

EP Search Report and Written Opinion dated Feb. 10, 2020 in priority EP application No. 19192401; w/English machine translation (total 12 pages).

Chinese Office Action and Search Report dated Feb. 21, 2024 in counterpart CN application No. 202080058379.5; w/ English machine translation (total 12 pages).

Japanese Office Action and Search Report dated Aug. 6, 2024 in counterpart application No. JP 2022-510880; w/ English machine translation (total 8 pages).

* cited by examiner

METHOD FOR MANUFACTURING A TIMEPIECE BEARING

The invention concerns a method for manufacturing a pivot bearing for the pivoting of a timepiece component, in particular the manufacture of a pivot jewel. The invention also concerns a pivot bearing obtained by that method, as well as an assembly comprising a bearing of that kind and a movement comprising a bearing of that kind or an assembly of that kind. The invention finally concerns a timepiece, in particular a watch, comprising a movement of that kind or an assembly of that kind or a bearing of that kind.

The regularity of the pivoting of a shaft, in particular of balance shaft type in an anti-shock device, is a key factor for the chronometric performance of a watch. In fact, any variation occurring over time, such as wear of the pivot or deterioration thereof because of impacts, induces modifications of the behavior of the oscillator that can provoke variations in the running of the watch.

There are known a plurality of geometries of pierced jewels (also known as bearings) such as are available on the market, sold by jewel suppliers. These geometries are in particular designated by the following terms: flat jewel with olive hole or cylindrical hole, support jewel with olive hole or cylindrical hole, semi-flat jewel with olive hole or cylindrical hole, flat jewel with olive hole or cylindrical hole and two depressions, domed jewel with olive hole or cylindrical hole.

These jewels can be assembled in combined settings and anti-shock devices.

The stones include a hole, which may be olive-cut or not, allowing pivoting of the pivot of the shaft against a pivot surface. Where the jewels assembled in combined in-settings and anti-shock devices are specifically concerned, the hole generally includes a depression on a first face of the stone, on the side of introduction of the pivot, intended to facilitate the insertion thereof. These jewels therefore include a first, generally flat face including the depression, and a flat or domed face opposite the depression. In the prior art jewels the distinction between the depression and the pivot zone or surface is easily made, the two parts being separated by a generally clean edge. That clean edge may prove problematic during the phase of insertion of the pivot, which may come to abut against the edge and be marked through contact therewith.

It is known to obtain ceramic-based sintered stones using pressing techniques, as is disclosed in the documents EP2778801 and EP3483665.

There are known from the document EP2778801 bearing geometries including a substantially spherical opening forming a first functional element, having a section the maximum diameter of which is substantially 4.5 times greater than the minimum diameter of the hole, as well as a substantially conical opening, forming a second functional element, having a section the maximum diameter of which is substantially twice the minimum diameter of the hole. The olive shape at the level of the hole aims to minimize the contact with a pivot but also to facilitate any lubrication.

There is equally found in the document EP3483665 a pierced stone geometry including a functional element forming an engagement cone of the bored stone. The geometry of this functional element addresses a need to facilitate the mounting of the pivot blind, in particular in an anti-shock device. Nevertheless, a sintered stone of this kind is opaque, unlike a ruby stone that has transparency properties.

It is apparent that the existing methods of manufacturing pivot bearings are not optimized and/or do not enable the manufacture of all shapes and/or do not enable the manufacture of all the materials that might be envisaged for a bearing of this kind.

The object of the invention is to provide a solution enabling optimization of the manufacture of a pivot bearing, enabling the disadvantages of the prior art to be remedied.

To this end, the invention is based on a method for manufacturing a pivot bearing for the pivoting of a timepiece component, in particular a pivot jewel, wherein it comprises the following steps:

boring a hole in a bearing blank along an axis intended for the pivoting of a timepiece component, this hole forming a start point of a first pivot zone of the bearing, then laser engraving, in the blank, in particular using a femtosecond laser, a second clearance zone of the bearing, juxtaposed with the start point of a first pivot zone, this second clearance zone of the bearing opening at a first face of the bearing blank, then removing material by means of wear, in particular by olive-cutting, at the start point of a first pivot zone of the bearing and a boundary zone between the start point of a first pivot zone of the bearing and the second clearance zone of the bearing in order to form a first pivot zone and a second clearance zone of the bearing that are juxtaposed, being connected to each other by a rounded connection.

The step consisting in boring a hole may comprise a sub-step consisting in obtaining a blank arranged between a first plane face and an opposite second plane face, then a sub-step consisting in boring a through-hole in a direction perpendicular to the first face.

The step consisting in laser engraving a second clearance zone of the bearing may comprise a plurality of successive sub-steps, each sub-step consisting in engraving the bearing blank in at least one plane distinct from the engraving of the preceding sub-steps.

Said distinct planes of the various successive sub-steps may be mutually parallel planes substantially parallel to the first face of the blank, and may be mutually superposed, extending between the first face of the blank and an intermediate plane positioned within the thickness of the bearing blank.

Each sub-step of the step consisting in laser engraving may employ an engraving circumscribed by a circular contour centered on the axis of said hole in a new distinct plane so that the step consisting in laser engraving generates a second clearance zone formed by engraving superposed disks in distinct planes the diameter of which decreases between the upper face and the intermediate plane, the engraving diameter in the intermediate plane being substantially equal to the diameter of the hole.

The distance between two successive planes of said distinct planes may be less than or equal to 2 µm, or even less than or equal to 1 µm.

The step consisting in laser engraving a second clearance zone of the bearing may employ engraving of a surface having some or all of the following features:

the second clearance zone forms a continuous spreading out or flaring out, with no edge, from the first pivot zone of the bearing to the first face of the bearing;

the second clearance zone has a substantially frustoconical shape in the form of a frustum of a cone that is straight or has a curved surface, in particular having a radius of curvature tending toward infinity in the vicinity of the first face;

the greatest diameter of the second clearance zone is greater than four times, or even greater than seven times, the smallest diameter of the first pivot zone;

the greatest section area of the second clearance zone is greater than 10 times or 25 times or 30 times or 50 times the smallest section area of the first pivot zone;

a first volume limited by the first pivot zone and two planes perpendicular to the axis and passing through the edges of the first pivot zone relative to the axis is less than 0.4 times or 0.35 times or 0.3 times or 0.25 times the second volume limited by the second clearance zone and two planes perpendicular to the axis and passing through the edges of the second clearance zone relative to the axis and/or a first volume limited by the first pivot zone and two planes perpendicular to the axis and passing through the edges of the first pivot zone relative to the axis is greater than 0.1 times or 0.15 times or 0.2 times the second volume limited by the second clearance zone and two planes perpendicular to the axis and passing through the edges of the second clearance zone relative to the axis;

the curves of intersection of the planes passing through the axis and perpendicular to the face with the second clearance zone are convex.

The step consisting in removing material by means of wear may use a diamond thread.

The step consisting in boring a hole in a bearing blank may utilize a broaching tool or a laser.

The step consisting in boring a hole in a bearing blank may comprise an enlarging sub-step consisting in imparting to the hole a diameter substantially equal to the smallest diameter of the first pivot zone of the bearing.

The method of manufacturing a bearing may comprise a step of turning the outside diameter of the bearing.

The method of manufacturing a bearing may comprise a buffing or polishing finishing step, in particular to reduce the roughness of the second clearance zone of the bearing.

The method of manufacturing a bearing may comprise a step consisting in round-off a second face of the blank opposite the first face so as to form a domed second face of the bearing and optionally to form a third clearance zone in the extension of the hole of the blank at the level of the second face.

The method of manufacturing a bearing may comprise a step of texturizing some or all of the second clearance zone and/or some or all of the third clearance zone, in particular using a femtosecond laser, so that the first pivot zone has a roughness different from that of the second clearance zone and/or so that the first pivot zone has an oleophilic surface and the second clearance zone has, over all or part of it, an oleophobic surface.

The blank may be made of synthetic ruby or of polycrystalline corundum or of ceramic such as zirconia, in particular yttriated zirconia, or of a monocrystalline alumina, or of an alumina-zirconia combination.

The invention also relates to a pivot bearing for the pivoting of a timepiece component, in particular a pivot stone, the bearing comprising a hole along an axis for the pivoting of the timepiece component about that axis and that has at least:

a first pivot zone of the timepiece component, and a second clearance zone extending from a first face of the bearing to the first pivot zone, the first face being perpendicular or substantially perpendicular to the axis and adapted to be oriented on the timepiece component side, the first pivot zone and the second clearance zone being connected to one another by a connecting round-off (a rounded connection).

The greatest diameter of the second clearance zone may be greater than four times or even seven times the smallest diameter of the pivot zone.

The greatest section area of the second clearance zone may be greater than 10 times or 25 times or 30 times or 50 times the smallest section area of the first pivot zone.

A first volume limited by the first pivot zone and two planes perpendicular to the axis and passing through the edges of the first pivot zone relative to the axis may be less than 0.4 times or 0.35 times or 0.3 times or 0.25 times the second volume limited by the second clearance zone and two planes perpendicular to the axis and passing through the edges of the second clearance zone relative to the axis and/or a first volume limited by the first pivot zone and two planes perpendicular to the axis and passing through the edges of the first pivot zone relative to the axis may be greater than 0.1 times or 0.15 times or 0.2 times the second volume limited by the second clearance zone and two planes perpendicular to the axis and passing through the edges of the second clearance zone relative to the axis.

The second clearance zone may have a frustoconical or globally frustoconical shape.

The second clearance zone may be such that the curves of intersection of the planes passing through the axis with the second clearance zone are convex.

The first pivot zone may be olive-cut.

The first pivot zone may have a roughness different from that of the second clearance zone and/or the first pivot zone may have an oleophilic surface and the second clearance zone have, over all or part of it, an oleophobic surface.

The invention also relates to an assembly, in particular a setting or plate or bridge or anti-shock device, comprising a bearing as described above.

The invention also relates to a timepiece movement comprising a bearing as described above.

The invention also relates to a timepiece, in particular a watch, in particular a wristwatch, comprising a bearing as described above.

The invention is more particularly defined by the claims.

These objects, features and advantages of the present invention will be disclosed in detail in the following non-limiting description of one particular embodiment with reference to the appended figures, in which.

Figure 1:
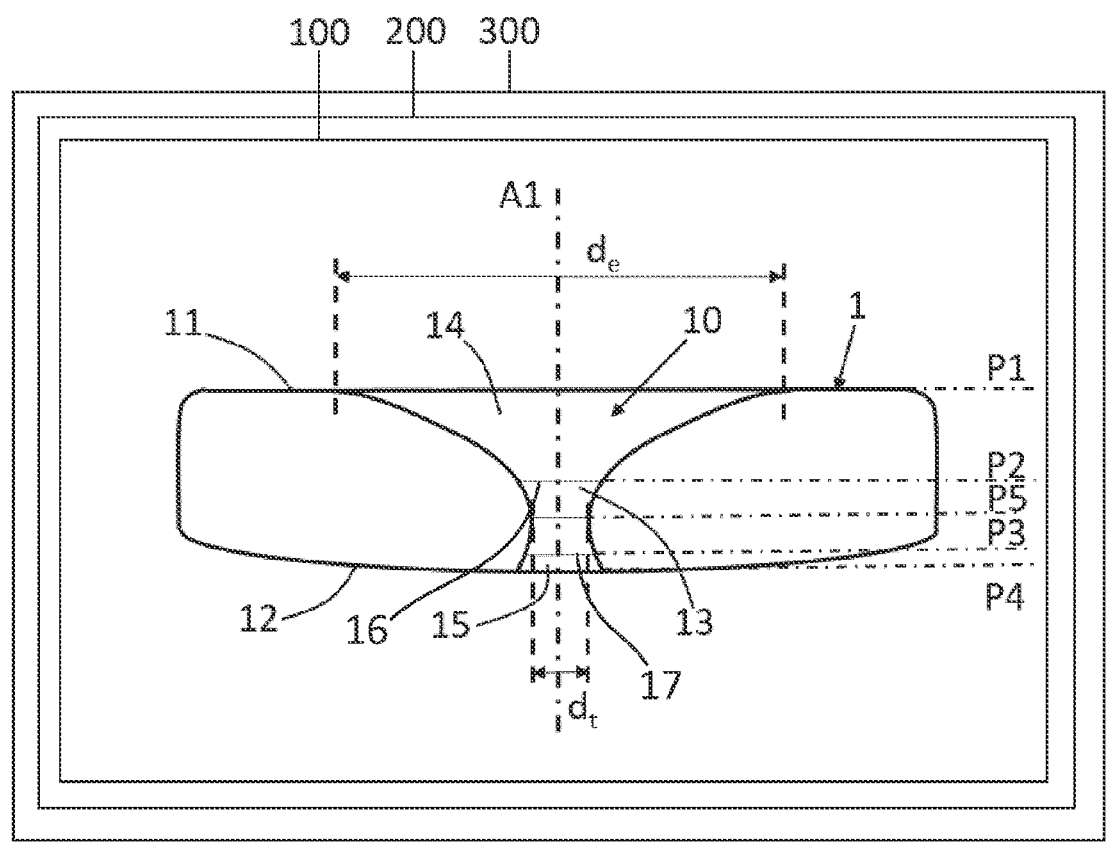
FIG. 1 is a schematic view of a first embodiment of a timepiece including one embodiment of a bearing according to the invention.

One embodiment of a timepiece 300 according to the invention is described hereinafter with reference to FIGS. 1 and 2. The timepiece 300 is for example a watch, such as a wristwatch.

The timepiece comprises a timepiece movement 200. The timepiece movement 200 is, for example, a mechanical movement, in particular an automatic movement. Alternatively, the movement may be an electronic movement.

The timepiece movement 200 comprises an assembly 100 comprising a pivot bearing 1 that will be more simply termed the bearing 1 hereinafter. The bearing enables guiding of a timepiece component 2 in rotation or in pivoting. The bearing therefore enables reception and guidance of a pivot of a timepiece component with respect to an axis A1. The component preferably comprises a shaft itself comprising at least the pivot.

For a bearing including a hole and an engagement depression or cone, the hole may be defined as the part of the stone in contact with which the pivot will come to pivot in normal operation. The diameter of the hole therefore substantially corresponds to the diameter of the pivot, ignoring tolerances and clearances.

For example, the timepiece component is a balance assembly of an oscillator of the balance-hairspring type. By "balance assembly" is meant an assembly consisting of a balance and a shaft, the balance being mounted on the shaft, in particular fixed to the shaft by driving.

For example, the assembly 100 may comprise a timepiece anti-shock device. An anti-shock device of this kind may comprise an in-setting, the bearing 1, a cap jewel and a spring. The bearing is then a bearing of pivoting jewel or pivot jewel type. Alternatively, the assembly 100 may comprise a bridge such as a plate or a balance bridge onto which a bearing 1 is fixed by driving.

The bearing 1 comprises a hole 10 along the axis A1 for the pivoting of the timepiece component 2 with respect to that axis A1. The axis A1 is therefore a pivot axis of the timepiece component 2.

The bearing 1, in particular the hole 10, is provided at least with:
- a first pivot zone or surface 13 of the timepiece component 2, and
- a second clearance zone or surface 14 extending from a first face 11 of the bearing to the first pivot zone 13.

The first face 11 is perpendicular or substantially perpendicular to the axis A1 and is intended to be oriented on the timepiece component 2 side.

The first pivot zone 13 and the second clearance zone 14 are connected to one another with no edge or are connected by a connecting round-off.

The bearing is preferably a stone or a jewel. That stone is preferably made of synthetic ruby, namely polycrystalline corundum. Alternatively, this stone may be manufactured from any other ceramic such as a zirconia, in particular an yttriated zirconia, or a monocrystalline alumina, or an alumina-zirconia combination.

The bearing preferably comprises a third clearance zone or surface 15 extending from the second face 12 of the bearing to the first pivot zone 13.

The second face 12 of the bearing is a face opposite the first face 11. The first and second faces are parallel or substantially parallel. Each is perpendicular or substantially perpendicular to the axis A1. In the embodiment represented, the first face is plane and the second face is domed (projects). The first face may alternatively be domed. The second face may alternatively be plane.

The second clearance zone is the zone by which the timepiece component 2, in particular a pivot of the timepiece component 2, is engaged in the bearing.

The third clearance zone 15 is the zone, opposite the second clearance zone relative to the first pivot zone and in which the timepiece component 2, in particular a pivot of the timepiece component 2, is able to project once placed in the bearing.

The bearing preferably has a shape of revolution about axis A1. In particular, the hole preferably has a shape of revolution about axis A1. Alternatively, only the first pivot zone of the hole may have a shape of revolution about axis A1. As a further alternative, only the first pivot zone and the second clearance zone of the hole may have a shape of revolution about axis A1 or only the first pivot zone and the third clearance zone of the hole may have a shape of revolution about axis A1.

The first pivot zone 13 is advantageously olive-cut.

As seen above, there is no visibly perceptible delimitation, such as for example an edge or a crest, between the first pivot zone 13 and the second clearance zone 14. In fact, the bearing walls or surfaces defining these zones are connected to one another by a connecting round-off or are connected to one another without forming an edge. Consequently, the direction of a plane tangential to the surface of the hole evolves with no discontinuity or sudden change of direction when that plane is moved in the hole over the first pivot zone and over the second clearance zone. In particular, the direction of a plane tangential to the surface of the hole evolves without discontinuity or sudden change of direction when that plane is moved, in the hole, from any point in the first pivot zone to any point in the second clearance zone. In other words, the curves of intersection of the planes passing through the axis A1 and perpendicular to the face (11) of the bearing defining the walls of the first pivot zone and of the second clearance zone do not feature any angular point at the interface between the first pivot zone and the second clearance zone, or even feature no angular point throughout their extent. The minimum radius of curvature of the surface or of the wall of the hole 10 at the interface of the first pivot zone and of the second clearance zone or the minimum radius of curvature of the connecting round-off is preferably greater than 0.05 mm. The minimum radius of curvature of the surface of the first pivot zone is more preferably greater than 0.05 mm.

A portion of the connecting round-off forms part of the first pivot zone and another part of the connecting round-off forms part of the second clearance zone.

The boundary between the first pivot zone and the second clearance zone is for example defined arbitrarily as the place at which the diameter of the hole (measured perpendicularly to the axis A1) is equal to 1.1 times the smallest diameter $d_t$ (measured perpendicularly to the axis A1) of the first pivot zone or of the hole 10. Alternatively, the boundary between the first pivot zone and the second clearance zone is defined as the place where the area of the section of the hole (measured perpendicularly to the axis A1) is equal to 1.2 times the smallest section area (measured perpendicularly to the axis A1) of the first pivot zone or of the hole 10. That boundary is referenced 16 in FIG. 1. As a further alternative, the boundary between the first pivot zone and the second clearance zone is defined as the place where the diameter of the hole is equivalent to 140% of the nominal diameter of the pivot at mid-height (the shaft comprising said pivot being at rest). Here by the term "pivot" is meant a portion of revolution of the shaft provided exclusively for pivoting of the shaft in the bearing.

The second clearance zone has a flared geometry. The second clearance zone forms a flaring out or a spreading out from the first pivot zone to the first face 11. The second clearance zone 14 preferably has a frustoconical or substantially frustoconical shape. The second clearance zone preferably comprises a curved surface the radius of curvature of which tends to infinity. In a complementary manner, the second clearance zone may equally have a frustoconical or substantially frustoconical shape cross section. Alternatively, the second clearance zone may have a frustoconical or substantially frustoconical shape cross section. The geometry of the second clearance zone enables the bearing to timepiece component distance to be maximized outside the first pivot zone and facilitates the return of the pivot into the first pivot zone should it come to exit the latter in the event of impacts to the wearer.

The curves of intersection of the planes passing through the axis A1 and perpendicular to the face 11 of the bearing defining the wall of the second clearance zone are preferably convex. By "convex" is meant that any straight line segment connecting any two points of the curve is located within the material forming the bearing.

The greatest diameter $d_e$ of the second clearance zone 14 (measured perpendicularly to the axis A1) is preferably greater than 4 times, or even greater than 7 times the smallest diameter $d_t$ of the first pivot zone 13 or of the hole 10 (measured perpendicularly to the axis A1).

The greatest section area of the second clearance zone 14 (measured perpendicularly to the axis A1) is more preferably greater than 10 times or 25 times or 30 times or 50 times the smallest section area of the first pivot zone 13 or of the hole 10 (measured perpendicularly to the axis A1).

A first volume limited by the first pivot zone 13 and two planes P2, P3 perpendicular to the axis A1 and passing through the edges of the first pivot zone 13 relative to the axis A1 is advantageously less than 0.4 times or 0.35 times or 0.3 times or 0.25 the second volume limited by the second clearance zone 14 and two planes P1, P2 perpendicular to the axis A1 and passing through the edges of the second clearance zone relative to the axis A1. The first volume limited by the first pivot zone 13 and two planes P2, P3 perpendicular to the axis A1 and passing through the edges of the first pivot zone 13 relative to the axis A1 is greater than 0.1 times or 0.15 times or 0.2 times the second volume limited by the second clearance zone 14 and two planes P1, P2 perpendicular to the axis A1 and passing through the edges of the second clearance zone relative to the axis A1.

The second volume more advantageously constitutes at least 65%, or even at least 70%, or even at least 80%, of a third volume limited by the surface of the hole and two planes P1, P4 perpendicular to the axis A1 and passing through the edges of the hole relative to the axis A1.

The first pivot zone 13 may advantageously have a different roughness to the second clearance zone 14. The first pivot zone may more particularly have an oleophilic surface while the second clearance zone may have, over its entirety or in part, an oleophobic surface. These roughnesses or structures may be obtained by a surface texturization or a treatment, preferably by a surface texturization obtained by means of a femtosecond laser. These roughnesses or textures may be obtained directly during the phase of machining the various zones or afterwards in a complementary finishing step.

In one embodiment the diameter $d_t$ is 0.076 mm and the diameter $d_e$ is 0.555 mm. The place containing the smallest diameter $d_t$ of the first pivot zone or of the hole 10 may constitute the middle of the pivot zone 13 or not. The plane P5 perpendicular to the axis A1 and passing through the place containing the diameter $d_t$ may more particularly be situated equidistantly from the planes P2 and P3 or not.

The third clearance zone 15, if any, may have a flared geometry. It may form a flaring out or a spreading out from the first pivot zone to the second face 12. The third clearance zone 15 preferably has a frustoconical or substantially frustoconical shape.

There need not exist any visually perceptible delimitation, such as an edge or a crest for example, between the first pivot zone 13 and the third clearance zone 15. In fact, the bearing surfaces defining these zones may advantageously be connected to one another by a connecting round-off or connected to one another without forming an edge. Consequently, the direction of a plane tangential to the surface of the hole evolves without discontinuity or sudden change of direction if this plane is moved in the hole over the first pivot zone and over the third clearance zone. In particular, the direction of a plane tangential to the surface of the hole evolves without discontinuity or sudden change of direction if this plane is moved, in the hole, from any point in the first pivot zone to any point in the third clearance zone. In other words, the curves of intersection of the planes passing through the axis A1 and perpendicular to the face 11 of the bearing 1 defining the walls of the first pivot zone and of the third clearance zone feature no angular point at the interface between the first pivot zone and the third clearance zone, or even feature no angular point over all their extent. The minimum radius of curvature of the surface of the hole 10 at the interface of the first pivot zone and of the third clearance zone or the minimum radius of curvature of the connecting round-off is preferably greater than 0.05 mm.

Part of the connecting round-off forms part of the first pivot zone and another part of the connecting round-off forms part of the third clearance zone.

For example, the boundary between the first pivot zone and the third clearance zone is arbitrarily defined as the place at which the diameter of the hole (measured perpendicularly to the axis A1) is equal to 1.02 times the smallest diameter $d_t$ (measured perpendicularly to the axis A1) of the first pivot zone or of the hole 10. Alternatively, the boundary between the first pivot zone and the third clearance zone is defined, for example, as the place at which the area of the section of the hole (measured perpendicularly to the axis A1) is equal to 1.04 times the smallest section area (measured perpendicularly to the axis A1) of the first pivot zone or of the hole 10. This boundary is referenced 17 in FIG. 1.

The pivot bearing 1 described above with reference to FIGS. 1 and 2 has a particular geometry in that it minimizes the risks of a pivot being degraded during its insertion into the bearing, as described above. This kind of bearing may advantageously be made of synthetic ruby so that it is able to have properties of transparency, thereby facilitating the insertion of said pivot.

Figure 8:
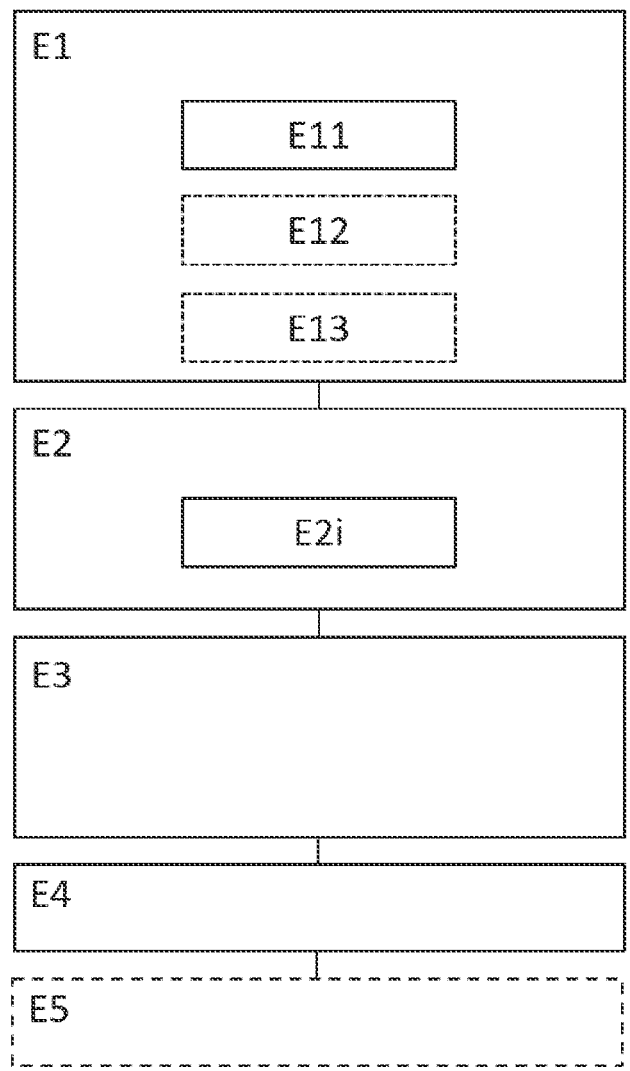
FIG. 8 represents schematically a flowchart of the method in accordance with the embodiment of the invention for manufacturing a pivot bearing.

The invention is based on a method of manufacturing a pivot bearing, particularly suitable for the manufacture of a bearing as described above. FIG. 8 illustrates schematically a flowchart of the steps of a method of manufacture of that kind in accordance with one embodiment of the invention. Of course, that same method remains suitable and continues to offer high performance for manufacturing any other pivot bearing.

Figure 3:
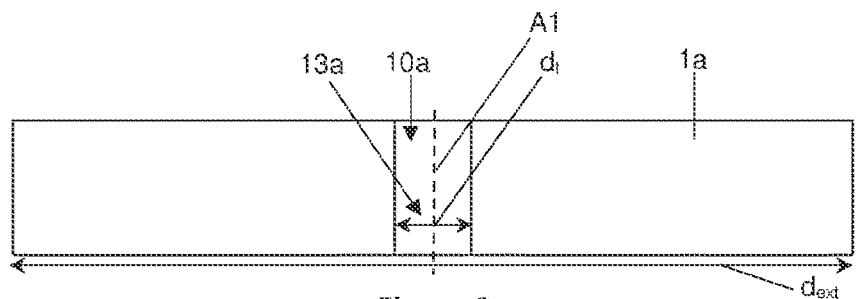
FIGS. 3 to 7 represent the steps of a method of manufacturing a pivot bearing according to one embodiment of the invention.

The method comprises a first step consisting in boring E1 a hole 10a in a bearing 1 blank 1a along an axis A1 intended for the pivoting of a timepiece component 2. That step is illustrated by FIG. 3. That hole 10a enables the formation of a start point 13a of a first pivot zone 13 as described above.

The method therefore advantageously comprises a preliminary sub-step consisting in obtaining a blank 1a of the bearing. That blank 1a may advantageously take the form of synthetic ruby or polycrystalline corundum. Alternatively, it may take the form of any other ceramic such as a zirconia, in particular an yttriated zirconia, or a monocrystalline alumina, or an alumina-zirconia combination. Moreover, this blank 1a is advantageously arranged between a first plane face 11a and a second plane face 12a opposite and parallel to the first face 11a. These two faces 11a, 12a of the blank 1a form blanks of the faces 11, 12 of the future bearing 1. They are respectively positioned in planes P1, P2. The method then comprises a sub-step E11 consisting in boring the hole 10a. That hole 10a is advantageously a through-hole. It is oriented in a direction perpendicular to said two faces 11a, 12a. It is centered on the axis A1. It advantageously has a cylindrical shape. The boring may be effected mechanically by means of a broaching tool or by means of a laser beam, in particular a femtosecond laser beam.

The first step optionally comprises another, enlarging sub-step E12 consisting in forming the hole 10a to a diameter substantially equal to the smallest diameter $d_r$ of the first pivot zone 13 of the future bearing 1 being manufactured. Alternatively, that same diameter $d_r$ may be obtained exclusively by means of the aforementioned first sub-step.

The first step further optionally comprises another sub-step of turning E13 the outside diameter $d_{ext}$ of the blank 1a of the bearing 1.

Figure 4:
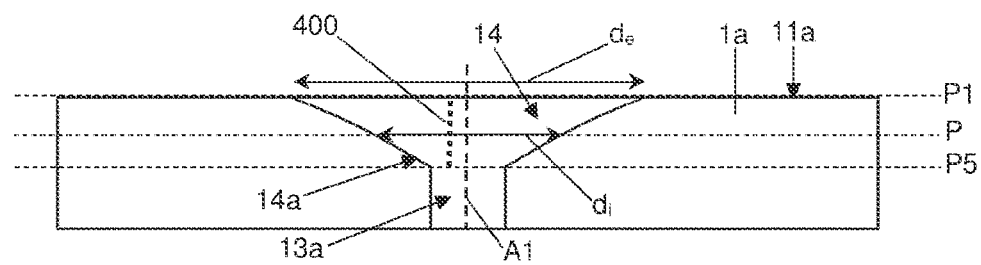

The method then comprises a second step consisting in laser engraving E2 in the blank 1a, in particular with the aid of a femtosecond laser, a second clearance zone 14 of the bearing 1, as illustrated by FIG. 4. This engraving is effected at the level of the hole 10a bored in the preceding step. The second clearance zone 14 to be formed is juxtaposed to the starting point 13a of the first pivot zone 13. Moreover it opens at the level of the first face 11a of the bearing 1 blank 1a.

The laser used in this second step is preferably a femtosecond laser. The latter produces ultra-short pulses in such a manner as not to affect thermally the machine material, at wavelengths adapted in order not to affect the structure of the material of the blank 1a. The laser beam 400 may be an infrared laser beam, in particular an infrared laser beam having a wavelength between 800 nm and 1100 nm inclusive, in particular a wavelength of 1030 nm±5 nm, or a green laser beam, in particular a green laser beam having a wavelength between 500 nm and 540 nm inclusive, in particular a wavelength of 515 nm±2.55 nm, or an ultraviolet laser beam, in particular an ultraviolet laser beam having a wavelength below 400 nm, in particular a wavelength of 343 nm±25 nm, or a blue laser beam, in particular a blue laser beam having a wavelength between 400 nm and 480 nm inclusive. Moreover, the laser beam may have an energy between 0.001 mJ and 2 mJ inclusive, or even between 0.004 mJ and 0.1 mJ inclusive, or even between 0.004 and 0.05 mJ inclusive. The laser beam may have a diameter between 5 µm and 100 µm inclusive, preferably between 10 µm and 60 µm inclusive, or even between 15 µm and 30 µm.

In accordance with this embodiment, the step consisting in laser engraving E2 a second clearance zone 14 of the bearing 1 comprises a plurality of successive sub-steps consisting in engraving the bearing 1 blank 1a in a plurality of distinct planes P. In other words, each sub-step may employ an engraving in a new plane distinct from the planes previously engraved. In this sub-step those previously engraved planes may optionally also undergo supplementary engraving, which thus does not exclude engraving in a plurality of planes in one and the same sub-step. Said distinct planes P are advantageously planes parallel to one another. The distance between two successive planes of said distinct planes P is preferably less than or equal to 2 µm, or even less than or equal to 1 µm. They are also advantageously substantially parallel to the first face 11a of the blank 1a, and are superposed on one another, extending between the first face 11a of the blank, in a first plane P1, and an intermediate plane P5 positioned within the thickness of the bearing 1 blank 1a. This laser engraving step is therefore also advantageously carried out at the start point 13a at the level of the future first pivot zone 13, between the intermediate plane P5 and the aforementioned plane P2 that forms the boundary between the first pivot zone 13 and the second clearance zone 14. It therefore forms a portion 14a that is located at the level of the boundary zone between the first pivot zone 13 and the second clearance zone 14. It also naturally forms the second clearance zone 14 as such, between the two planes P1, P2.

Each sub-step of the second step consisting in laser engraving E2 advantageously employs engraving inscribed within a circular contour centered on the axis A1 of the hole 10a, the diameter of which may decrease between the upper face 11a (or the plane P1) and the intermediate plane P5; the engraving diameter in the intermediate plane P5 may be substantially equal to the diameter of the hole 10a.

To be more precise, the second step consisting in laser engraving E2 may comprise n sub-steps E2i (with 1≤i≤n) of passage of a laser beam 400 in n planes P parallel or substantially parallel to the planes P1 and P5 and disposed between the planes P1 and P5. The laser beam more particularly passes through n surfaces respectively circumscribed by a circle of diameter $d_i$ centered on the axis A1 at the level of each of the planes P disposed between the planes P1 and P5. Those sub-steps may be specified in the following manner:
    a first sub-step E21 may consist in the passage of the laser beam 400 substantially at the level of the plane P1. This first sub-step E21 may more particularly consist in causing the laser beam 400 to pass along a predefined trajectory over a surface circumscribed by a circle with axis A1 of diameter $d_1=d_e$;
    that first sub-step E21 is followed by n-2 sub-steps in which the laser beam will be moved along a predefined trajectory in the n-2 surfaces, with 1<i≤n, respectively disposed at the level of n-2 planes P at progressively greater distances from the plane P1, in accordance with a movement parallel or substantially parallel to the axis A1 until reaching the plane P5. In each plane P the sub-step E2i may consist in causing the laser beam 400 to pass along a predefined trajectory over a surface circumscribed by a circle with axis A1 of diameter $d_i$, with $d_r \le d_i \le d_e$;
    in the final sub-step E2n, the laser beam 400 is moved along a predefined trajectory at the level of the plane P5. This final sub-step E2n may more particularly consist in causing the laser beam 400 to pass along a predefined trajectory over a surface circumscribed by a circle with axis A1 of diameter $d_n=d_r$.

Note that the engraving in each plane has a small thickness, which is why it may be considered as surface engraving, that thickness nevertheless being sufficient to form an engraved volume by superposing all the engravings on the various aforementioned surfaces.

In the aforementioned embodiment, each sub-step of the second step consisting in laser engraving E2 advantageously employs engraving inscribed in a circular contour centered on the axis A1 of the hole 10a, the diameter of which decreases between the upper face 11a (or the plane P1) and the intermediate plane P5; the engraving diameter in the plane P1 may be equal to the diameter $d_e$ and the engraving diameter in the intermediate plane P5 may be substantially equal to the diameter $d_r$.

Alternatively, each sub-step of the second step consisting in laser engraving E2 advantageously employs engraving inscribed in a circular contour centered on the axis A1 of the hole 10a in a new plane P. A sub-step of this kind may simultaneously proceed to complementary engraving of the previously engraved planes. Accordingly, in each sub-step, a previously engraved plane may be engraved again on a surface inscribed in a circular contour centered on the axis A1 of increased radius. The engraving diameter in each plane P already engraved therefore increases in each sub-step. By way of example, the engraving in the plane P1 may increase in each sub-step, finally varying from a value $d_f$ during the first sub-step to the value $d_e$ during the last sub-step.

As a further alternative, each sub-step of the second step consisting in laser engraving E2 advantageously employs engraving inscribed in a circular contour centered on the axis A1 of the hole 10a, the diameter of which may vary randomly between the values $d_f$ and $d_e$. In this case, the laser may engrave a plurality of planes P during a sub-step, as explained above.

As mentioned above, the distance between the planes P is adapted to obtain the most continuous possible finished surface at the level of the wall of the second clearance zone 14.

Finally, the step consisting in laser engraving E2 the second clearance zone 14 of the bearing 1 employs engraving of a surface having some or all of the following features:
- the second clearance zone 14 forms a flaring out or a spreading out that is continuous with no edge from the first pivot zone 13 of the bearing 1 (or from the start point 13a of that first pivot zone 13) as far as the first face 11a of the bearing 1;
- the second clearance zone 14 has a substantially frusto-conical shape in the form of a frustum of a cone with a straight or curved surface, in particular having a radius of curvature tending to infinity in the vicinity of the first face 11a;
- the greatest diameter $d_e$ of the second clearance zone 14 is greater than 4 times, or even greater than 7 times the smallest diameter $d_r$ of the first pivot zone 13;
- the greatest section area of the second clearance zone 14 is greater than 10 times or 25 times or 30 times or 50 times the smallest section area of the first pivot zone 13;
- the first volume limited by the first pivot zone 13 (between the two planes (P2, P3) perpendicular to the axis A1) is less than 0.4 times or 0.35 times or 0.3 times or 0.25 times the second volume limited by the second clearance zone 14 (between the two planes (P1, P2) perpendicular to the axis A1) and/or a first volume limited by the first pivot zone 13 (between the two planes (P2, P3) perpendicular to the axis A1) is greater than 0.1 times or 0.15 times or 0.2 times the second volume limited by the second clearance zone 14 (between the two planes (P1, P2) perpendicular to the axis A1);
- the curves of intersection of the planes passing through the axis A1 and perpendicular to the face 11a or 11 with the second clearance zone 14 are convex.

Figure 5:
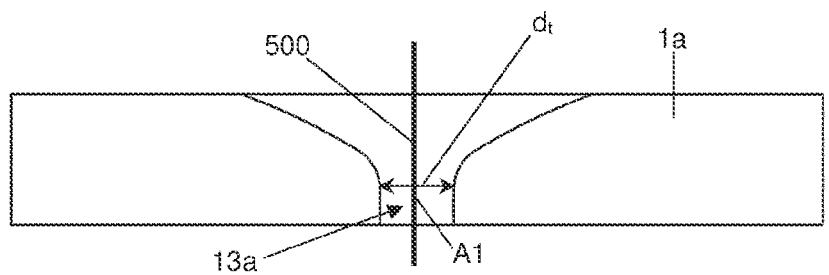
Figure 6:
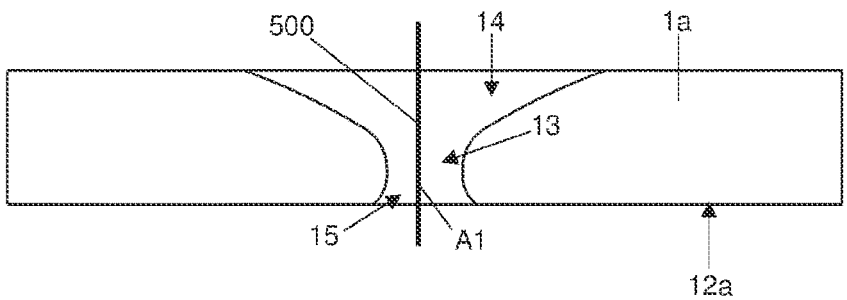

The method then comprises a third step consisting in removing material by means of wear E3 at the level of the start point 13a of the first pivot zone 13 of the bearing 1 and of a boundary zone 14a between said start point 13a of a first pivot zone 13 of the bearing 1 and the second clearance zone 14 of the bearing 1, in order to form the first pivot zone 13 and the second clearance zone 14 of the bearing 1 in a juxtaposed manner, connected to one another by a connecting round-off. This third step of removing material by means of wear E3 may be an olive-cutting step, as represented in FIGS. 5 and 6.

To be more precise, the third step may consist in passing a diamond thread 500 through the hole 10a and causing the bearing blank 1a to move relative thereto so as to modify the cylindrical character of the start point 13a by imparting to it its definitive first pivot zone 13 shape. This shape is sometimes termed an "olive" shape. When the second step has finished, the first pivot zone 13 is free of any edge. The minimum diameter $d_r$ is measured by considering a circle in an intermediate plane P5 with a diameter tangential to the closest together walls of the first pivot zone 13.

In a complementary way, the diamond thread 500 also acts on at least a boundary portion 14a of the second clearance zone 14 adjoining the start point 13a or the first pivot zone 13. Thus the first and second zones 13, 14 are connected to one another with no edge and/or are connected to one another by a connecting round-off. These first and second zones 13, 14 thus form a continuous wall or a continuous surface thanks to the synergy of two techniques, the first being the laser engraving and the second being the removal of material by wear.

The diamond thread 500 also acts on the junction of the hole 10a and the second face 12a of the blank 1a. This transition zone between the second face 12a and the first pivot zone 13 forms the third clearance zone 15 described above. The first and third zones 13, 15 are therefore connected to one another without any edge and/or are connected to one another by a connecting round-off thanks to this third step. The third clearance zone 15 is arranged in the extension of the hole 10a in the blank 1a and opens at the level of the second face 12a of the bearing 1 blank 1a.

Figure 7:
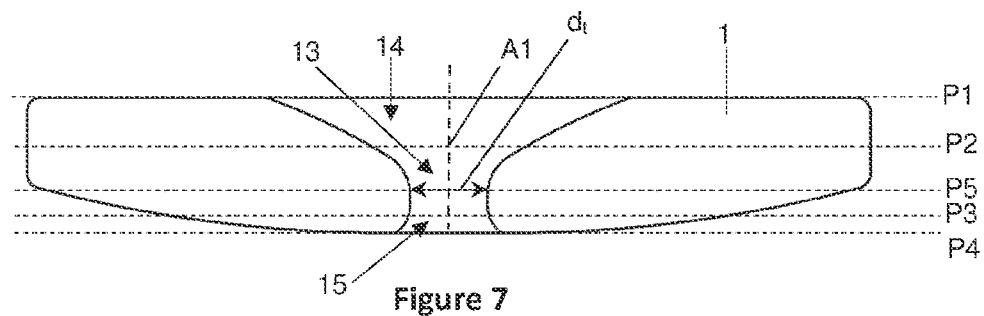

The method may then optionally comprise a fourth finishing step E4, by buffing or polishing, so as to obtain the finished bearing 1. A step of this kind may consist in buffing the bearing 1 blank 1a with the aid of diamond paste. This step may comprise different sub-steps aiming to minimize the roughness of the bearing blank 1a, in particular on the walls of the second clearance zone 14 and on its faces 11a, 12a. A sub-step may in particular be provided to impart a domed appearance to the second face 12 of the bearing 1. FIG. 7 illustrates the pivot bearing 1 finally obtained, after execution of this fourth finishing step E4 and in particular of the aforementioned sub-step. Note that this bearing 1 then comprises a hole 10 delimited by the surfaces of the various zones 13, 14, 15 formed by the method of the invention from the initial hole 10a in the blank, which therefore itself forms a blank of the future hole 10.

In an alternative embodiment of the method the fourth finishing step E4 may be inserted between the second step E2 and the third step E3, what is most important being that the third step E3 is effected downstream of the second step E2.

An optional step E5 of texturizing all or part of the clearance zone 14 and/or of all or part of the clearance zone 15 may equally be provided. This step is preferably executed with the aid of a femtosecond laser. This step may be effected upstream or downstream of the finishing step E4.

Figure 2:
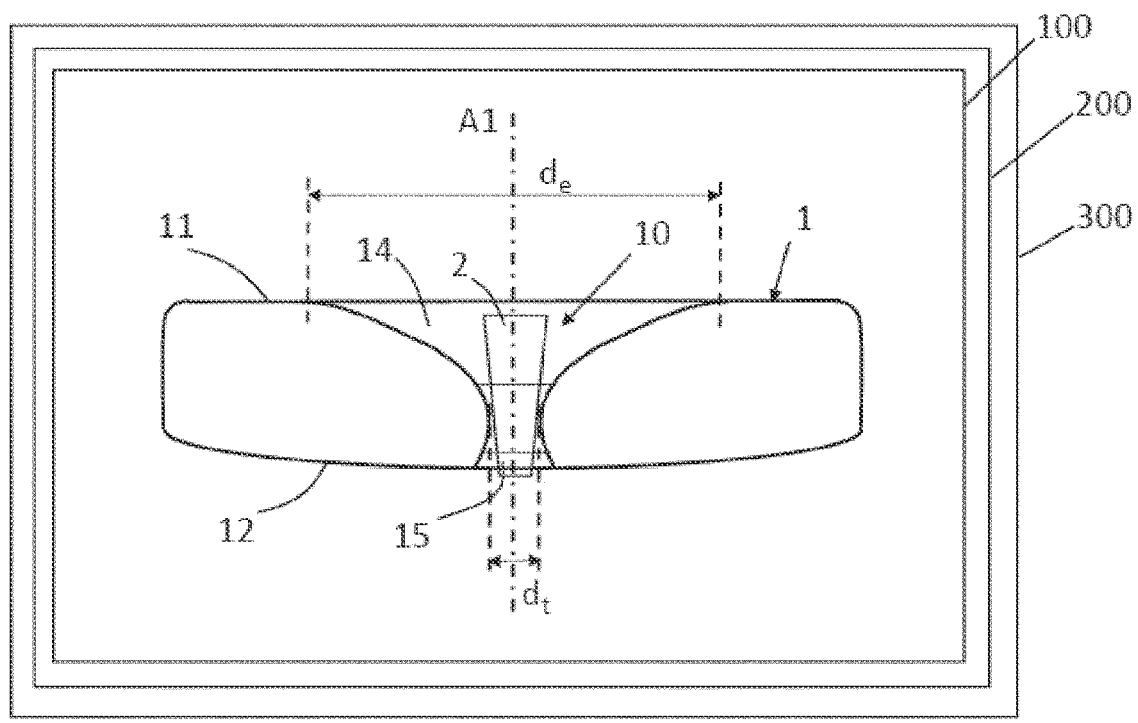
FIG. 2 is a schematic view of the first timepiece embodiment including also a timepiece component pivoted in the bearing.

Of course, the method described above is particularly suitable for forming a pivot jewel as represented in FIGS. 1 and 2, but likewise remains suitable for the manufacture of any other timepiece bearing.

The invention claimed is:

1. A method for manufacturing a pivot bearing for pivoting of a timepiece component, wherein the method comprises:
   boring a hole in a bearing blank along an axis intended for the pivoting of the timepiece component, the hole including a first pivot zone of the bearing, the first pivot zone being located at a distance from a first face of the bearing blank, then laser engraving, in the bearing blank, a second clearance zone of the bearing, the second clearance zone of the bearing opening at a first face of the bearing blank and extending from the first face to the first pivot zone, then removing material by wear, at a boundary zone of the first pivot zone of the bearing and the second clearance zone of the bearing, so that after the removing of material by wear, the first pivot zone and the second clearance zone of the bearing are juxtaposed and connected to each other by a rounded connection in the boundary zone.

2. The method as claimed in claim 1, wherein the boring of the hole comprises:
obtaining a blank arranged between a first plane face and an opposite second plane face, then
boring a through-hole in a direction perpendicular to the first plane face.

3. The method as claimed in claim 1, wherein the laser engraving of the second clearance zone of the bearing comprises a plurality of performing successive engravings of the bearing blank, wherein each engraving is in at least one plane distinct from the preceding engravings.

4. The method as claimed in claim 3, wherein the distinct planes of the successive engravings are mutually parallel planes parallel to the first face of the blank, and are mutually superposed, extending between the first face of the blank and an intermediate plane positioned within a thickness of the bearing blank.

5. The method as claimed in claim 4, wherein each of the successive engravings of the laser engraving employs an engraving circumscribed by a circular contour centered on the axis of the hole in a new distinct plane so that the laser engraving generates a second clearance zone formed by engraving superposed disks in distinct planes whose diameters decrease between the first face and the intermediate plane, a diameter of the engraving in the intermediate plane being substantially equal to a diameter of the hole.

6. The method as claimed in claim 3, wherein a distance between two successive planes among the distinct planes is at most 2 µm.

7. The method as claimed in claim 1, wherein the laser engraving of the second clearance zone of the bearing employs engraving of a surface having at least one of the following features:
the second clearance zone forms a continuous spreading out or flaring out, with no edge, from the first pivot zone of the bearing to the first face of the bearing;
the second clearance zone has a substantially frustoconical shape having a shape of a frustum of a cone that is straight or has a curved surface;
a greatest diameter of the second clearance zone is greater than four times a smallest diameter of the first pivot zone;
a greatest section area of the second clearance zone is greater than 10 times a smallest section area of the first pivot zone;
a first volume limited by the first pivot zone and two planes perpendicular to the axis is less than 0.4 times a second volume limited by the second clearance zone and two planes perpendicular to the axis;
a first volume limited by the first pivot zone and two planes perpendicular to the axis is greater than 0.1 times a second volume limited by the second clearance zone and two planes perpendicular to the axis;
curves of intersection of the planes passing through the axis and perpendicular to the first face with the second clearance zone are convex.

8. The method as claimed in claim 1, wherein the removing of material by wear uses a diamond thread.

9. The method as claimed in claim 1, wherein the boring of the hole in the bearing blank utilizes a broaching tool or a laser.

10. The method as claimed in claim 1, wherein the boring of the hole in the bearing blank comprises enlarging the hole by imparting to the hole a diameter substantially equal to a smallest diameter of the first pivot zone of the bearing.

11. The method as claimed in claim 1, wherein the method comprises turning an outside diameter of the bearing.

12. The method as claimed in claim 1, wherein the method comprises finishing by buffing or polishing.

13. The method as claimed in claim 12, wherein the finishing by buffing or polishing reduces a roughness of the second clearance zone of the bearing.

14. The method as claimed in claim 1, wherein the method comprises rounding off a second face of the blank opposite the first face so as to form a domed second face of the bearing.

15. The method as claimed in claim 1, wherein the method comprising texturizing at least a portion of the second clearance zone, at least a portion of the third clearance zone, or both at least a portion of the second clearance zone and at least a portion of the third clearance zone, so that the first pivot zone has a roughness different from a roughness of the second clearance zone, so that the first pivot zone has an oleophilic surface and the second clearance zone has, over all or part of the second clearance zone, an oleophobic surface, or so that both the first pivot zone has a roughness different from a roughness of the second clearance zone and the firs pivot zone has an oleophilic surface and the second clearance zone has, over all or part of the second clearance zone, an oleophobic surface.

16. The method as claimed in claim 1, wherein the blank is made of a material selected from the group consisting of synthetic ruby, polycrystalline corundum, ceramic, monocrystalline alumina, and alumina-zirconia combinations.

17. The method as claimed in claim 16, where the blank is made of yttriated zirconia.

18. The method as claimed in claim 1, wherein the pivot bearing is a pivot jewel.

19. The method as claimed in claim 1, wherein the laser engraving uses a femtosecond laser.

20. The method as claimed in claim 1, wherein the removing of material by wear uses olive-cutting.

* * * * *